US011799153B2

(12) United States Patent
Chang et al.

(10) Patent No.: US 11,799,153 B2
(45) Date of Patent: Oct. 24, 2023

(54) BATTERY CASING, METHOD FOR MANUFACTURING THE SAME, AND DEVICE CONTAINING BATTERY CASING

(71) Applicant: Contemporary Amperex Technology Co., Limited, Ningde (CN)

(72) Inventors: Tongxin Chang, Ningde (CN); Tianming Chen, Ningde (CN); Ruiqi Han, Ningde (CN); Zhiming Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 176 days.

(21) Appl. No.: 17/557,011

(22) Filed: Dec. 20, 2021

(65) Prior Publication Data

US 2022/0115720 A1 Apr. 14, 2022

Related U.S. Application Data

(63) Continuation of application No. PCT/CN2020/124129, filed on Oct. 27, 2020.

(30) Foreign Application Priority Data

Nov. 15, 2019 (CN) .......................... 201911117959.2

(51) Int. Cl.
*H01M 10/658* (2014.01)
*H01M 10/613* (2014.01)
(Continued)

(52) U.S. Cl.
CPC ............. *H01M 10/658* (2015.04); *A62C 3/07* (2013.01); *A62C 5/006* (2013.01);
(Continued)

(58) Field of Classification Search
CPC . A62C 3/07; A62C 5/006; A62C 3/16; H01M 10/658; H01M 10/482;
(Continued)

(56) References Cited

U.S. PATENT DOCUMENTS

2010/0187465 A1* 7/2010 Guo ..................... A62D 1/0092
252/5

FOREIGN PATENT DOCUMENTS

CN 101085400 A 12/2007
CN 101554520 A 10/2009
(Continued)

OTHER PUBLICATIONS

PCT International Search Report for PCT/CN2020/124129, dated Feb. 2, 2021, 21 pages.
(Continued)

*Primary Examiner* — Kiran Quraishi Akhtar
(74) *Attorney, Agent, or Firm* — East IP P.C.

(57) ABSTRACT

The present disclosure discloses a battery casing, a method for manufacturing the same, and a device including a battery casing. A battery casing includes a casing body, a plurality of battery cells accommodated in the casing body, and a fire protection plate which is disposed inside the casing body at least corresponding to the plurality of battery cells and includes a thermal aerosol fire protection layer which includes an aerosol generating agent, wherein a total mass A of the aerosol generating agent in the casing body and a free space volume B of the casing body satisfy a relationship as represented by 0.03 g/L≤A/B≤8 g/L.

13 Claims, 4 Drawing Sheets

(51) Int. Cl.
  *H01M 10/625* (2014.01)
  *H01M 50/209* (2021.01)
  *H01M 50/317* (2021.01)
  *A62C 3/07* (2006.01)
  *A62C 5/00* (2006.01)
  *H01M 10/48* (2006.01)

(52) U.S. Cl.
  CPC ....... *H01M 10/482* (2013.01); *H01M 10/613* (2015.04); *H01M 10/625* (2015.04); *H01M 50/209* (2021.01); *H01M 50/317* (2021.01); *H01M 2220/20* (2013.01)

(58) Field of Classification Search
  CPC ............. H01M 10/613; H01M 10/625; H01M 10/647; H01M 10/6595; H01M 50/209; H01M 50/317; H01M 50/242; H01M 50/249; H01M 50/383; H01M 50/24; H01M 2200/10; H01M 2220/20; Y02E 60/10
  See application file for complete search history.

(56) References Cited

FOREIGN PATENT DOCUMENTS

| | | |
|---|---|---|
| CN | 105280974 A | 1/2016 |
| CN | 205122719 U | 3/2016 |
| CN | 106876810 A | 6/2017 |
| CN | 107185132 A | 9/2017 |
| CN | 206526431 U | 9/2017 |
| CN | 107754198 A | 3/2018 |
| CN | 107887550 A | 4/2018 |
| CN | 108054460 A | 5/2018 |
| CN | 207602663 U | 7/2018 |
| CN | 108355293 A | 8/2018 |
| CN | 109718490 A | 5/2019 |
| CN | 109904356 A | 6/2019 |
| CN | 110420415 A | 11/2019 |
| CN | 210182465 U | 3/2020 |
| CN | 210403969 U | 4/2020 |
| DE | 102013200734 A1 | 7/2014 |
| EP | 3790106 A1 | 3/2021 |
| JP | 2009099322 A | 5/2009 |
| JP | 2014036713 A | 2/2014 |
| JP | 2014509286 A | 4/2014 |
| JP | 2014144033 A | 8/2014 |

OTHER PUBLICATIONS

The First Office Action for Chinese Application No. 201911117959.2, dated May 19, 2021, 17 pages.
The Second Office Action for Chinese Application No. 201911117959.2, dated Jul. 20, 2021, 15 pages.
The Rejection Decision for Chinese Application No. 201911117959.2, dated Sep. 15, 2021, 6 pages.
The Reexamination Decision for Chinese Application No. 201911117959.2, dated Dec. 1, 2021, 2 pages.
The extended European search report for EP Application No. 20886351.4, dated Mar. 24, 2022, 10 pages.
The First Office Action for European Application No. 20886351.4, dated Oct. 7, 2022, 6 pages.
The First Office Action for Japanese Application No. 2022-526105, dated Jun. 5, 2023, 6 pages.

* cited by examiner

BATTERY CASING, METHOD FOR MANUFACTURING THE SAME, AND DEVICE CONTAINING BATTERY CASING

CROSS REFERENCE TO RELATED DISCLOSURE

This application is a continuation of International Application No. PCT/CN2020/124129 filed on Oct. 27, 2020, which claims priority to Chinese Patent Application No. 201911117959.2, tilted "BATTERY CASING AND DEVICE" and filed on Nov. 15, 2019, both of which are incorporated herein by reference in their entireties.

TECHNICAL FIELD

The present disclosure relates to a technical field of energy storage devices, and particularly relates to a battery casing, a method for manufacturing the same, and a device including a battery casing.

BACKGROUND

Under the current energy shortage and the increasingly severe environmental protection situation, electric vehicles have become a major focus of development, and the future development tendency is to gradually replace traditional fuel vehicles by pure electric vehicles. In order to ensure the driving range and power performance of the vehicle, a battery casing containing a large number of mono-batteries is usually used. When the battery casing is over-charged, over-discharged, abused mechanically, abused thermally, and the like, thermal runaway of a mono-battery in the battery casing will be caused. The thermal runaway mono-battery may start an open fire, cause structural damage to the casing structure, and further threaten the safety of the vehicle driver and the passenger. The thermal runaway of one or more mono-batteries in the battery casing will even aggravate the spread of thermal runaway in the casing body, thereby further deteriorating the safety condition of the entire vehicle. The improvement of the safety performance of the battery casing has a significant effect on the wide application of electric vehicles. Therefore, how to improve the safety performance of the battery casing has become a key technical problem to be solved urgently.

SUMMARY

The present disclosure provides a battery casing having a high safety performance and a device using the battery casing.

A first aspect of the present disclosure provides a battery casing, including a casing body, a plurality of battery cells accommodated in the casing body, and a fire protection plate which is disposed inside the casing body, at least disposed corresponding to the plurality of battery cells, and includes a thermal aerosol fire protection layer which includes an aerosol generating agent, wherein a total mass A of the aerosol generating agent in the casing body and a free space volume B of the casing body satisfy a relationship as represented by 0.03 gram/litre (g/L)≤A/B≤8 g/L.

In the present disclosure, by disposing the fire protection plate containing the aerosol generating agent in the battery casing and controlling the total mass A of the aerosol generating agent in the casing body and the free space volume B of the casing body to satisfy a specific relationship, the open fire of the battery casing can be effectively extinguished and the re-ignition of the open fire of the battery casing can be effectively retarded, thereby enabling the battery to have a high safety performance.

In addition, the disposition of the fire protection plate will not significantly increase the volume and weight of the battery casing, and thus can also ensure the battery casing to have a high volume energy density and a weight energy density.

In an embodiment of an aspect of the present disclosure, the total mass A of the aerosol generating agent in the casing body and the free space volume B of the casing body satisfy a relationship as represented by 0.03 g/L≤A/B≤4 g/L. In some embodiments, 0.05 g/L≤A/B≤1 g/L. With the value of AB within an appropriate range, the fire protection efficiency and the safety performance of the battery casing can be improved, and also the amount of the gas production can be appropriate in the battery casing, thereby preventing damaging the structure of the casing body due to excessive gas pressure in the casing body.

In an embodiment of an aspect of the present disclosure, the aerosol generating agent includes an oxidant, a combustible agent, and a binder, the oxidant includes one or more of nitrate, halogen acid salt, and perhalic acid salt, and the combustible agent includes one or more of an organic combustible agent and an inorganic combustible agent. By using the suitable aerosol generating agent, a more efficient fire protection effect can be achieved so as to extinguish the fire quickly and timely, and also the re-ignition of the extinguished flame can be effectively retarded.

In an embodiment of an aspect of the present disclosure, the nitrate is selected from one or more of sodium nitrate, potassium nitrate, strontium nitrate, and ammonium nitrate. By using the oxidant described above, a better fire protection effect can be obtained.

In an embodiment of an aspect of the present disclosure, the halogen acid salt is selected from one or more of potassium halate and sodium halate. In some embodiments, the halogen acid salt includes one or more of potassium chlorate and sodium chlorate. By using the oxidant described above, a better fire protection effect can be obtained.

In an embodiment of an aspect of the present disclosure, the perhalic acid salt is selected from one or more of potassium perhalate and sodium perhalate. In some embodiments, the perhalic acid salt includes one or more of potassium perchlorate and sodium perchlorate. By using the oxidant described above, a better fire protection effect can be obtained.

In an embodiment of an aspect of the present disclosure, the organic combustible agent is selected from a solid organic compound. In some embodiments, the organic combustible agent includes a sugar. In some embodiments, the organic combustible agent includes one or more of cellulose, nitrocellulose, a cotton chip, a paper chip, a wood chip, lactose, sucrose, iditol, and the like. By using the combustible agent described above, a better fire protection effect can be obtained.

In an embodiment of an aspect of the present disclosure, the inorganic combustible agent is selected from one or more of phosphorus, sulfur, a carbon-based combustible agent, and a metal-based combustible agent. In some embodiments, the inorganic combustible agent includes one or more of phosphorus, sulfur, biomass charcoal, magnesium, aluminum, zirconium, and magnesium aluminum alloy. By using the combustible agent described above, a better fire protection effect can be obtained.

In an embodiment of an aspect of the present disclosure, the binder includes one or more of a natural resin and a synthetic resin. In some embodiments, the binder includes one or more of phenolic resin, polyvinyl chloride, shellac, rosin, and epoxy resin.

In an embodiment of an aspect of the present disclosure, the aerosol generating agent may include 50-80 parts by weight of the oxidant, 10-35 parts by weight of the combustible agent, and 1-5 parts by weight of the binder. With the aerosol generating agent satisfying the above conditions, a better fire protection effect can be obtained by the battery casing.

In an embodiment of an aspect of the present disclosure, the aerosol generating agent may further include an additive which includes one or more of carbonate, bicarbonate, metal halide, ammonium halide, and metal oxide. In some embodiments, the additive includes one or more of carbonate and bicarbonate. By adding the above additive to the aerosol generating agent, the fire protection efficiency can be further improved, and also the fire extinguishing reaction can quickly and repeatedly progress, thereby preventing the re-ignition of the open fire of the battery casing.

In an embodiment of an aspect of the present disclosure, the carbonate salt includes one or more of magnesium carbonate, strontium carbonate, potassium carbonate, and sodium carbonate; and/or the bicarbonate salt includes one or more of magnesium bicarbonate, potassium bicarbonate, and sodium bicarbonate; and/or the metal halide includes one or more of potassium chloride, sodium chloride, magnesium chloride, and strontium chloride; and/or the metal oxide includes one or more of potassium oxide, sodium oxide, magnesium oxide, and strontium oxide. By adding the above additive to the aerosol generating agent, the fire protection efficiency can be further improved and also the re-ignition of the open fire of the battery casing can be prevented.

In an embodiment of an aspect of the present disclosure, the aerosol generating agent may contain less than or equal to 20 parts by weight of the additive. In some embodiments, the aerosol generating agent may contain less than or equal to 15 parts by weight of the additive. In some embodiments, the aerosol generating agent may include 5-15 parts by weight of the additive. By adding an appropriate amount of additive to the aerosol generating agent, the fire protection effect of the fire protection plate can be improved.

In an embodiment of an aspect of the present disclosure, the thermal aerosol fire protection layer may further include an accelerant which includes one or more of nitrocellulose, celluloid, sulfur, and camphor. By adding the accelerant to the fire protection plate, the temperature for triggering the fire protection of the fire protection plate can be reduced, thereby achieving a quick and timely fire protection effect.

In an embodiment of an aspect of the present disclosure, the accelerant is present in the thermal aerosol fire protection layer in percentage by weight of 0.5%-10%. In some embodiments, the accelerant is present in the thermal aerosol fire protection layer in percentage by weight of 1%-10%. In some embodiments, the accelerant is present in the thermal aerosol fire protection layer in percentage by weight of 2%-5%. With the thermal aerosol fire protection layer containing an appropriate amount of accelerant, a quick and timely fire protection effect can be achieved.

In an embodiment of an aspect of the present disclosure, the fire protection plate may further include an accelerant layer, the accelerant layer stacked with the thermal aerosol fire protection layer, and/or the accelerant layer disposed on at least one side of the thermal aerosol fire protection layer, and the accelerant layer includes one or more of nitrocellulose, celluloid, sulfur, and camphor. With the fire protection plate including the accelerant layer containing the accelerant, the temperature for triggering the fire protection of the fire protection plate can be reduced, thereby achieving a quick and timely fire protection effect.

In an embodiment of an aspect of the present disclosure, the accelerant layer may be 10 micrometers-200 micrometers in thickness. In some embodiments, the accelerant layer is 50 micrometers-100 micrometers in thickness. With the accelerant layer having a thickness within an appropriate range, a more quick and timely fire protection effect can be achieved and also a high energy density can be obtained by the battery casing.

In an embodiment of an aspect of the present disclosure, encapsulating layers may be disposed on opposite two sides of the fire protection plate in its own thickness direction so as to isolate and protect the structure between the encapsulating layers on the two sides. By providing the encapsulating layer, the moisture or the like in the air can be prevented from penetrating into the thermal aerosol fire protection layer and the optional accelerant layer, thereby guaranteeing the high fire protection efficiency of the fire protection plate.

In an embodiment of an aspect of the present disclosure, the encapsulating layer may be 10 micrometers-200 micrometers in thickness. In some embodiments, the encapsulating layer is 50 micrometers-100 micrometers in thickness. With the encapsulating layer having an appropriate thickness, an effective moisture proof effect can be exerted and also the thermal aerosol fire protection layer can be ensured to be triggered quickly and effectively.

In an embodiment of an aspect of the present disclosure, there may be one or more fire protection plates inside the casing body, and in the case where there may be more than one fire protection plate in the casing body, each of the fire protection plates is disposed corresponding to at least one of the plurality of battery cells.

In an embodiment of an aspect of the present disclosure, the fire protection plate is disposed between at least two adjacent ones of the plurality of battery cells. The fire protection plate can perform fire protection on the thermal runaway battery cells in a targeted manner, thereby retarding the spread of the thermal runaway in the casing body more effectively.

In an embodiment of an aspect of the present disclosure, the fire protection plate is disposed on at least one side of at least one of the plurality of battery cells in a width direction of a corresponding one of the plurality of battery cells. The fire protection plate is disposed on the surface of the battery cell, thereby triggering the fire protection effect on the thermal runaway battery cell quickly and retarding the spread of the thermal runaway in the casing body more effectively.

In an embodiment of an aspect of the present disclosure, the fire protection plate is disposed on a side of the at least one of the plurality of battery cells where an explosion-proof valve is located. By disposing the fire protection plate on the side of the battery cell where the explosion-proof valve is located, the fire protection can be performed on a fixed position of the thermal runaway battery cell directly and quickly, the spread of the thermal runaway is retarded, and the fire extinguishing efficiency can be improved.

In an embodiment of an aspect of the present disclosure, the fire protection plate is disposed on an inner side wall and/or an inner top wall of the casing body. The fire protection plate disposed on the inner top wall of the casing body usually directly faces the explosion-proof valve of the battery cell, so the fire protection will be performed on the thermal runaway mono-battery of this battery cell more directly and quickly, thereby retarding the spread of the thermal runaway more effectively and improving the fire extinguishing efficiency.

In an embodiment of an aspect of the present disclosure, a buffering separation plate is disposed between every two adjacent ones of the plurality of battery cells, the buffering separation plate is disposed with an accommodating portion including an opening, and the fire protection plate is disposed in the accommodating portion. During cycling and storing of the battery, when an expansion force is generated inside the battery cell, the buffering separation plate can provide a buffering effect, thereby effectively releasing the stress generated by the expansion of the battery cell and reducing the battery expansion efficiency. Disposing the fire protection plate in the accommodating part of the buffering separation plate facilitates the battery casing to have a high volume energy density; and also the fire protection can be performed on a fixed position of the thermal runaway battery cell in a targeted manner, thereby retarding the spread of the thermal runaway in the battery case more effectively.

In an embodiment of an aspect of the present disclosure, the accommodating portion may be located in a peripheral region of the buffering separation plate, and the area of the fire protection plate is 10%-40% of the area of the buffering separation plate. In some embodiments, the area of the fire protection plate is 15%-30% of the area of the buffering separation plate. As long as the buffering separation plate disposed with the fire protection plate satisfy the above conditions, the fire protection plate can exert the fire protection effect more effectively, and also the buffering separation plate is maintained to have a better buffering effect.

In an embodiment of an aspect of the present disclosure, the fire protection plate may also be disposed on an outer side of the casing body. When the overall temperature of the casing body rises or an open fire overflows, the fire protection plate on the outer side of the casing body can be triggered to cool down the casing body or extinguish the fire. The fire protection plate on the outer side of the casing body can also retard the thermal runaway of the battery casing caused by the high temperature source or fire source outside the battery casing, and provide comprehensive fire protection for the battery casing.

A second aspect of the present disclosure provides a device including the battery casing according to the first aspect of the present disclosure. Since the device of the present disclosure includes the battery casing of the present disclosure, it can at least have a high safety performance.

A third aspect of the present disclosure provides a method for manufacturing a battery casing including the following steps:

obtaining a casing body, a plurality of battery cells, and a fire protection plate, the fire protection plate including a thermal aerosol fire protection layer, which includes an aerosol generating agent;

disposing the plurality of battery cells in the casing body; and disposing the fire protection plate in the casing body at least corresponding to the plurality of battery cells, wherein a total mass A of the aerosol generating agent in the casing body and a free space volume B of the casing body satisfy a relationship as represented by $0.03 \text{ g/L} \leq A/B \leq 8 \text{ g/L}$.

In the manufacturing method of the present disclosure, by disposing the fire protection plate containing the aerosol generating agent in the battery casing and controlling the total mass A of the aerosol generating agent in the casing body and the free space volume B of the casing body to satisfy a specific relationship, the open fire of the battery casing can be effectively extinguished and the re-ignition of the open fire of the battery casing can be effectively retarded, thereby enabling the battery casing to have a high safety performance.

BRIEF DESCRIPTION OF THE DRAWINGS

In order to further illustrate the technical solutions of the embodiments of the present disclosure clearly, the drawings used in the embodiments of the present disclosure will be briefly described below, it is obvious that the drawings described below are merely some embodiments of the present disclosure, and for those skilled in the art, other drawings can be obtained according to the drawings without any creative work.

DETAILED DESCRIPTION

Figure 1:
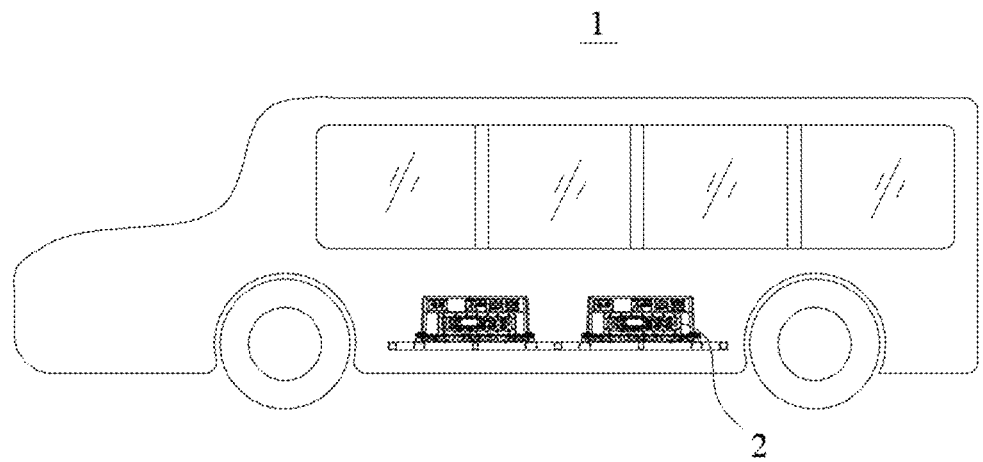
FIG. 1 is a schematic view of a device provided by an embodiment of the present disclosure.

In order to make the objects, technical solutions, and advantageous technical effects of the present disclosure more clear, the present disclosure will be further described in detail below with reference to the embodiments. It is to be understood that the embodiments described herein are merely illustrative of the present disclosure and are not intended to limit the present disclosure.

In the description of the present disclosure, it should be noted that, unless otherwise stated, the meaning of "several" is one or more; the meaning of "a plurality" is two or more; "no less than" and "no more than" shall be construed as including the number itself; the orientation or positional relation indicated by the terms "upper", "lower", "inner", "outer" and the like are orientation or positional relation based on the orientation shown in the drawings, and it is merely simplified for convenience of describing the present disclosure and simplification of the description, and does not indicate or imply that the pointed device or element must have a particular orientation, be constructed and operated in a specific orientation, and therefore should not be understood as limiting the present disclosure.

In the description of the present disclosure, it should be noted that, unless otherwise stated, the terms "installation", "connected to", and "connected with" are to be understood broadly, and may be, for example, a fixed connection, a disassemble connection, or an integral connection; and they can be connected directly or indirectly through an intermediate medium. The specific meaning of the above terms in the present disclosure can be understood by the person skilled in the art according to actual situation.

For the sake of brevity, only some numerical ranges are explicitly disclosed herein. However, ranges from any lower limit may be combined with any upper limit to form a range not explicitly recited; and ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The above summary of the present disclosure is not intended to describe each disclosed embodiment or every implementation. The following description more particularly exemplifies the exemplary embodiments. In many places throughout the present disclosure, guidance is provided through a series of embodiments that can be used in various combinations. In each instance, the list is merely representative and should not be construed as exhaustive.

The embodiments of the present disclosure provide a device that uses a battery casing as a power source. The device can be, but is not limited to, an electric vehicle (such as a pure electric vehicle, a hybrid electric vehicle, a plug-in hybrid electric vehicle, an electric bicycle, an electric scooter, an electric golf cart, or an electric truck), an electric train, a ship and a satellite, an energy storage system, and the like.

FIG. 1 is a device 1 taken as an example. The device 1 is an electric vehicle, which may be a pure electric vehicle, a hybrid electric vehicle, or a plug-in hybrid electric vehicle. As shown in FIG. 1, the electric vehicle includes a vehicle body and a battery casing 2. The battery casing 2 is disposed in the vehicle body. The vehicle body is disposed with a drive motor electrically connected to the battery casing 2. The battery casing 2 provides electric power to the drive motor. The drive motor is connected to wheels on the vehicle body through a transmission mechanism to drive the vehicle to travel. Optionally, the battery casing 2 may be disposed on the bottom of the vehicle body.

Figure 2:
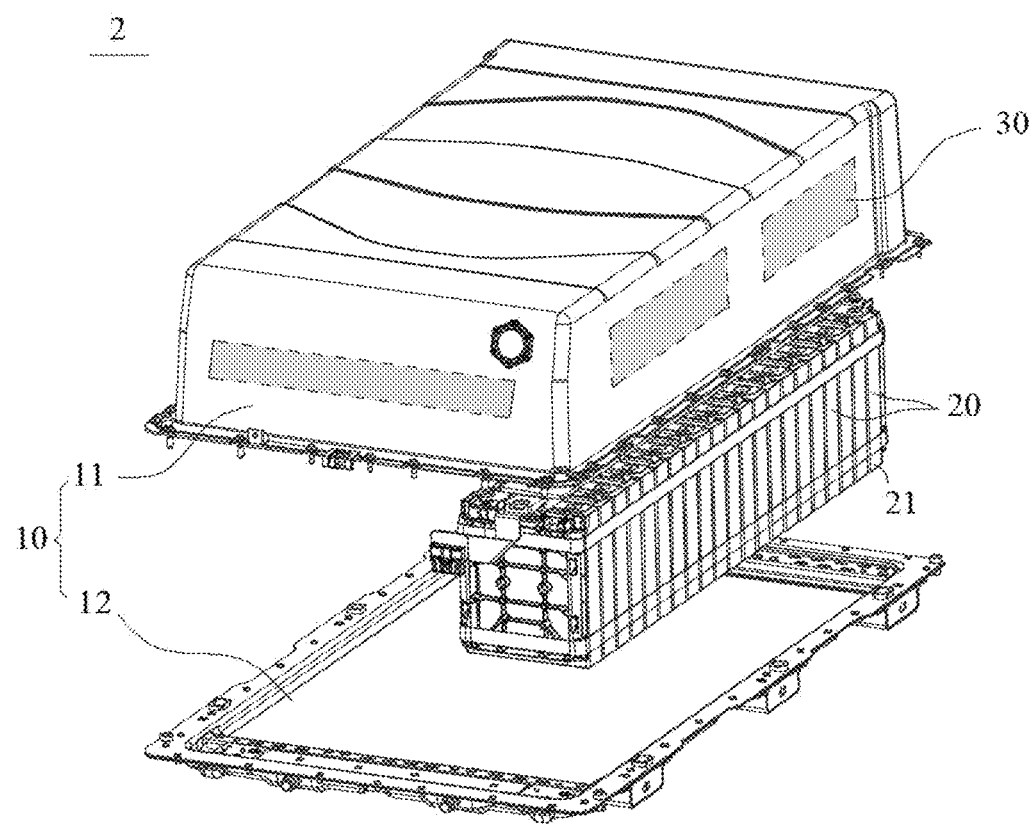
FIG. 2 is an exploded view of a battery casing provided by an embodiment of the present disclosure.

The safety performance of the battery casing 2 plays an important role on the device. Therefore, the embodiments of the present disclosure provide the battery casing 2 with high safety performance. With reference to FIG. 2, the battery casing 2 includes a casing body 10, a plurality of battery cells 20 accommodated in the casing body 10, and a fire protection plate 30. Each of the plurality of battery cells 20 independently includes one or more mono-batteries 21.

Figure 3:
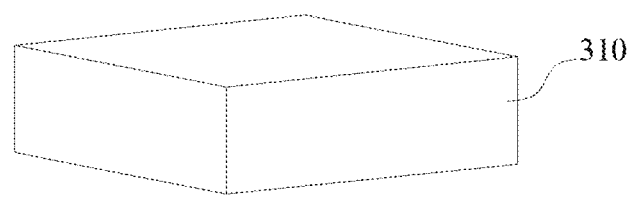
FIG. 3 is an exploded view of a fire protection plate provided by an embodiment of the present disclosure.

The fire protection plate 30 is disposed inside the casing body 10 at least corresponding to the plurality of battery cells 20 (a dashed line in FIG. 2 represents that the fire protection plate 30 is located in the casing body 10). With reference to FIG. 3, the fire protection plate 30 includes a thermal aerosol fire protection layer 310 which contains an aerosol generating agent. A total mass A of the aerosol generating agent in the casing body 10 and a free space volume B of the casing body 10 satisfy a relationship as represented by 0.03 g/L≤A/B≤8 g/L.

"The fire protection plate 30 is disposed at least corresponding to the plurality of battery cells 20" means that when one or more of the mono-batteries 21 of the plurality of battery cells 20 are thermal runaway, the fire protection plate 30 is heated by the erupting high-temperature air flow or the generated open fire, thereby the fire protection plate 30 exerts cooling and/or fire-extinguishing effects. In particular, it means that an orthographic projection of the fire protection plate 30 in a direction toward the battery cell 20 is at least partially projected on the battery cell 20.

The free space of the casing body 10 refers to a remaining space except the space occupied by the plurality of battery cells 20 in the space enclosed by the casing body 10, the fire protection plate 30, and other accessories. The volume of the remaining space, that is, the volume of the air in the casing body 10, is the free space volume B of the casing body 10.

In the battery casing 2 of an embodiment of the present disclosure, the fire protection plate 30 is disposed at least inside the casing body 10. The fire protection plate 30 includes the thermal aerosol fire protection layer 310 containing the aerosol generating agent, which contains an oxidant and a combustible agent. When a certain one or more mono-batteries 21 in the casing body 10 is thermal runaway, the fire protection plate 30 may be heated by the erupting high-temperature air flow or the generated open fire, and the aerosol generating agent will combust to generate aerosol after absorbing the heat and reaching a certain temperature. The aerosol contains carbon dioxide, water vapor, and even inert gas such as nitrogen, which can dilute the oxygen concentration in the casing body 10 and facilitate to extinguish fire. At the same time, the aerosol further contains liquid or solid particle, a volume of the particle is small and a specific surface area is large. The particle can absorb the heat generated by the battery when being thermal runaway, thereby facilitating the reduction of the temperature in the battery casing 2. In particular, the particle can absorb active group (such as H·, OH·, or O·) in the high-temperature air flow or flame, thereby cutting off the reaction chain of flame combustion and further improving the fire extinguishing effect.

In particular, the present inventors surprisingly found that by controlling a total mass A of the aerosol generating agent in the casing body 10 measured in g and the free space volume B of the casing body 10 measured in L to satisfy a specific relationship, the open fire in the casing body 10 can be effectively and quickly extinguished, and the re-ignition of the open fire of the battery casing 2 can be effectively retarded, thereby significantly improving the safety performance of the battery casing 2.

In addition, the amount of aerosol generating agent is small. Moreover, the disposition of the fire protection plate 30 will not significantly increase the volume and weight of the battery casing. Therefore, the present disclosure can also ensure a high volume energy density and a high weight energy density of the battery casing 2.

For convenience, a fire extinguishing parameter of the battery casing 2 is defined as K=A/B. K may be ≥0.03 g/L, ≥0.07 g/L, ≥0.01 g/L, ≥0.15 g/L, ≥0.02 g/L, ≥0.25 g/L, ≥0.3 g/L, ≥0.4 g/L, or ≥0.5 g/L. In addition, K may be ≤8 g/L, ≤7 g/L, ≤6 g/L, ≤5 g/L, ≤4 g/L, ≤3 g/L, ≤2 g/L, or ≤1 g/L. With the appropriate fire distinguishing parameter K of the battery casing 2, the battery casing 2 is enabled to have a high fire protection efficiency, thereby greatly improving the safety performance of the battery casing 2, and also the battery casing 2 is enabled to have both high volume energy density and weight energy density. If the fire extinguishing parameter K of the battery casing 2 is too small, the fire extinguishing effect cannot be effectively exerted.

In some embodiments, 0.03 g/L≤K≤4 g/L. For example, 0.04 g/L≤K≤2 g/L, 0.05 g/L≤K≤1 g/L, 0.06 g/L≤K≤1 g/L, 0.01 g/L≤K≤1 g/L, 0.02 g/L≤K≤1 g/L, 0.03 g/L≤K≤1 g/L, or 0.3 g/L≤K≤0.6 g/L. The fire extinguishing parameter K of the battery casing 2 can enable the battery casing 2 to have a high fire extinguishing efficiency, thereby greatly improving the safety performance of the battery casing 2, and also an appropriate amount of gas production is present in the battery casing 2, thereby preventing the structure of the casing body 10 from damaging due to excessive gas pressure in the casing body 10.

In the battery casing 2 of an embodiment of the present disclosure, the casing body 10 is used to package the plurality of battery cells 20 and related accessories. There are no special limitations on the structure and shape of the casing body 10, and those skilled in the art can select or design according to requirements.

As an example, as shown in FIG. 2, the casing body 10 may include a casing cover 11 and a casing base 12. The casing cover 11 includes a cap plate and side cover plates connected to the cap plate, and the cap plate and the side cover plates are enclosed to form a hood-like body with an opening. The casing cover 11 can be covered on the casing base 12 so as to form an enclosed space for accommodating the battery cell 20. The plurality of battery cells 20 are fixed on the casing base 12, and the casing cover 11 is covered on the casing base 12 so as to enclose the battery cells 20 in the casing body 10.

In the battery casing 2 of an embodiment of the present disclosure, each of the plurality of battery cells 20 independently includes one or two or more mono-batteries 21. For example, there are 1, 2, 3, 4, 5, or the like mono-batteries 21 in the battery cell 20, and the number can be selected according to actual requirements. The shape and type of the mono-battery 21 are not particularly limited, and, for example, the signal battery may be a ternary battery or a lithium iron phosphate battery and may be a cylindrical battery or a square battery.

The disposition of the battery cell 20 in the casing body 10 is not particularly limited, and those skilled in the art can select according to actual requirements. For example, the plurality of battery cells 20 are arranged along a thickness direction of the battery cells 20 to form a battery pack, and one or two or more battery packs are arranged in the casing body 10 along a width direction and/or a height direction of the battery cells 20.

In the battery casing 2 of an embodiment of the present disclosure, the fire protection plate 30 is disposed in the casing body 10 in various ways. In some embodiments, the fire protection plate 30 may be a continuous plate, which is disposed in the casing body 10 corresponding to the plurality of battery cells 20 in the casing body 10. When any one or more mono-batteries 21 are thermal runaway and the high-temperature heat flow is erupted or the open fire is broke out, the cooling and extinguishing effects of the aerosol generating agent in the fire protection plate 30 are triggered, thereby effectively retarding the spread of the thermal runaway in the casing body 10.

The fire protection plate 30 of the continuous plate structure is disposed in the casing body 10 in various ways. For example, the fire protection plate 30 is disposed on one or two or more of an inner side wall of the casing body 10, an inner top wall of the casing body 10, a side face of the plurality of battery cells 20 (such as at least one side face of the battery cell 20 in the width direction), and a top face (that is, a side where an explosion-proof valve is located) of the plurality of battery cells 20.

In some embodiments, a plurality of fire protection plates 30 are disposed inside the casing body 10, and each fire protection plate 30 is disposed corresponding to at least one battery cell 20.

Figure 4:
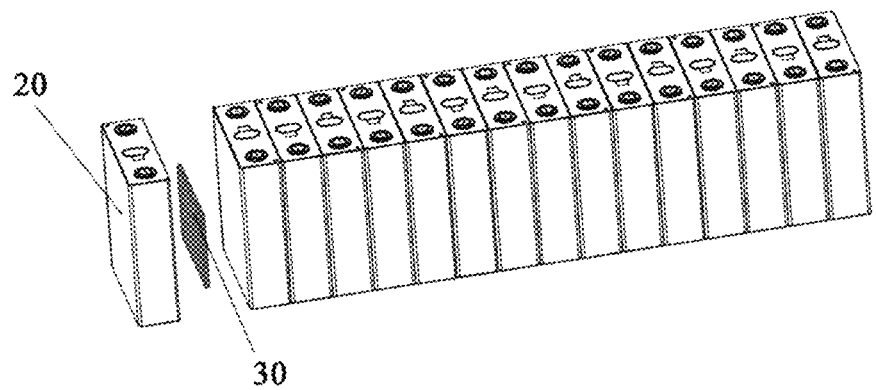
FIG. 4 is a schematic view of a disposing position of a fire protection plate in a battery casing provided by an embodiment of the present disclosure.

In a first example, the plurality of battery cells 20 are arranged along the thickness direction of the battery cells 20 to form the battery packs, and two or more of the battery packs are arranged in the casing body 10 along the width direction and/or height direction of the battery cells 20. With reference to FIG. 4, the fire protection plate 30 may be disposed between at least two adjacent battery cells 20. For example, the fire protection plate 30 may be disposed between every two adjacent battery cells 20. In this way, the thermal runaway battery cell 20 is protected against fire in a targeted manner, and the spread of the thermal runaway in the casing body 10 can be retarded more effectively.

Figure 5:
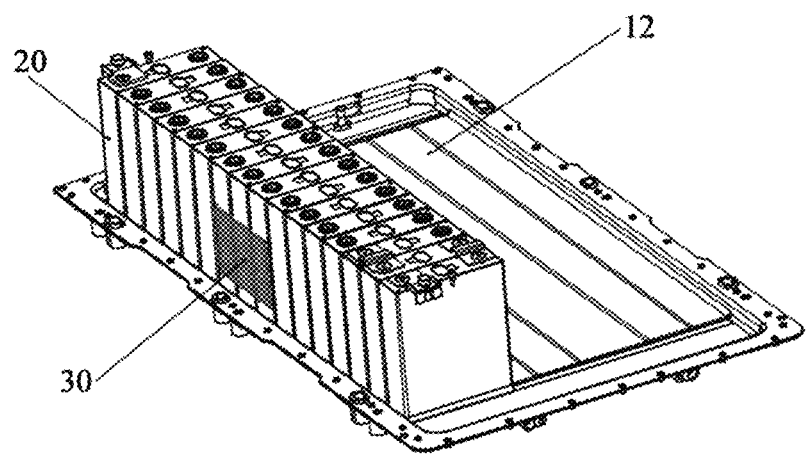
FIG. 5 is a schematic view of another disposing position of a fire protection plate in a battery casing provided by an embodiment of the present disclosure.

In a second example, the arrangement of the battery cells 20 is the same as that of the first example. With reference to FIG. 5, the fire protection plate 30 may be disposed on at least one side of the at least one battery cell 20 in its or their own width direction. For example, each of the plurality of fire protection plates 30 is disposed corresponding to one or more battery cells 20, and is disposed on any one side or both sides of the one or more battery cells 20 in its or their own width direction.

In a third example, the arrangement of the battery cells is the same as that of the first example. The fire protection plate 30 is disposed on the side where the explosion-proof valve of the at least one battery cell 20 is located. For example, each of the plurality of fire protection plates 30 is disposed corresponding to one or more battery cells 20 and on the side where the explosion-proof valve of the one or more battery cells 20 is located. The high-temperature air flow in the thermal runaway mono-battery 21 would usually break through the explosion-proof valve and flow out, the open fire would also spread from an opening of the explosion-proof valve, and since the fire protection plate 30 is disposed on the side where the explosion-proof valve of the mono-battery 21 is located, the fire protection is performed on a fixed position of the thermal runaway mono-battery 21 directly and quickly, thereby effectively retarding the spread of the thermal runaway and improving the fire extinguishing efficiency.

In a fourth example, the arrangement of the battery cells is the same as that of the first example. The fire protection plate 30 is arranged on the inner side wall and/or inner top wall of the casing body 10. For example, each of the plurality of fire protection plates 30 is disposed corresponding to one or more battery cells 20 and on the inner side wall, inner top wall, or both inner side and inner top walls of the casing body 10. The fire protection plate 30 disposed on the inner top wall of the casing body 10 usually directly faces the explosion-proof valve of the mono-battery, so the fire protection will be performed on the thermal runaway mono-battery 21 directly and quickly, thereby retarding the spread of the thermal runaway and improving the fire extinguishing efficiency more effectively.

In a fifth example, the arrangement of the battery cells is the same as that of the first example. In addition, a buffering separation plate is disposed between adjacent battery cells 20. During the battery cycling and storage, when expansion force is generated inside the battery cell 20, the buffering separation plate can act as a buffer due to its compressibility, thereby effectively releasing the stress generated by the battery cell 20 due to the expansion and reducing the battery expansion efficiency.

Figure 6:
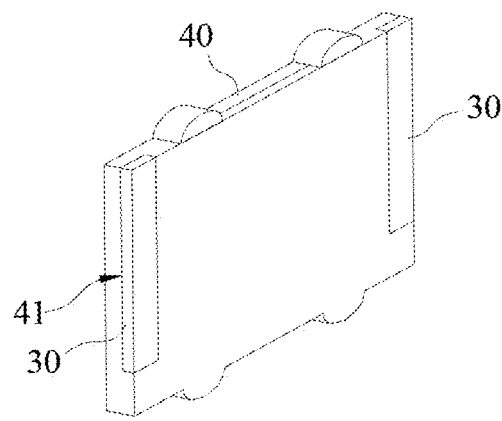
FIG. 6 is a schematic view of a structure of a buffering separation plate containing a fire protection plate provided by an embodiment of the present disclosure.
Figure 7:
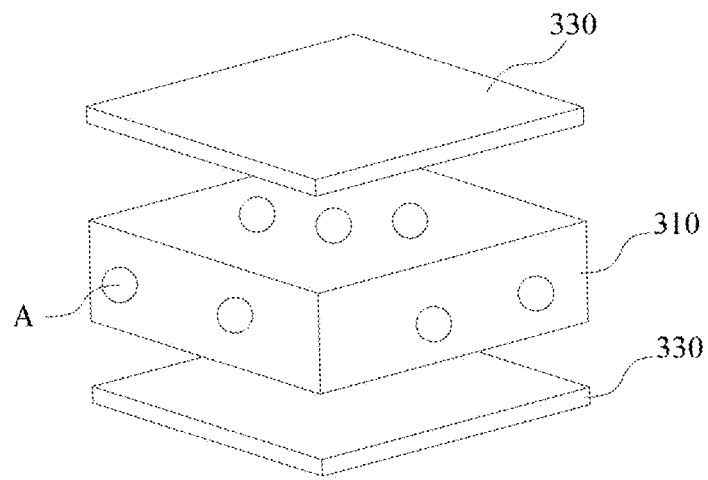
FIG. 7 is an exploded view of another fire protection plate provided by an embodiment of the present disclosure.
Figure 8:
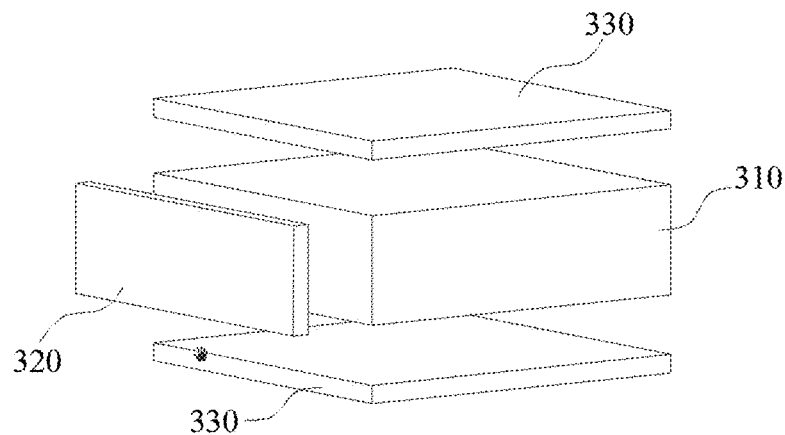
FIG. 8 is an exploded view of another fire protection plate provided by an embodiment of the present disclosure.
Figure 9:
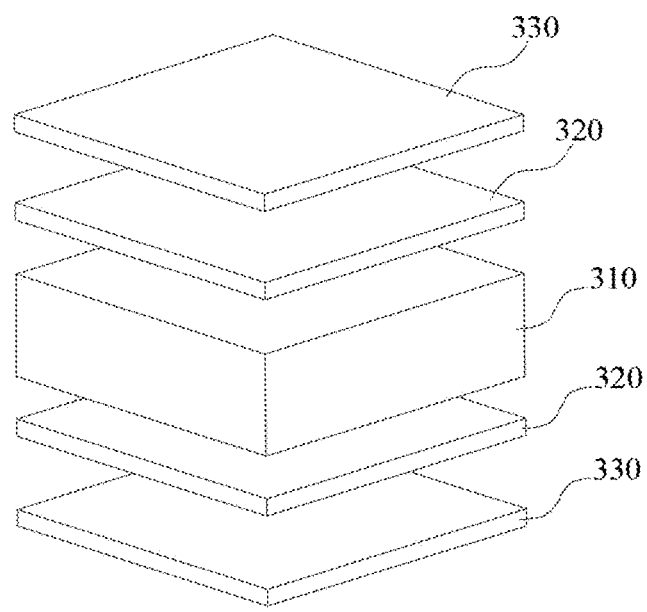
FIG. 9 is an exploded view of another fire protection plate provided by an embodiment of the present disclosure.
Figure 10:
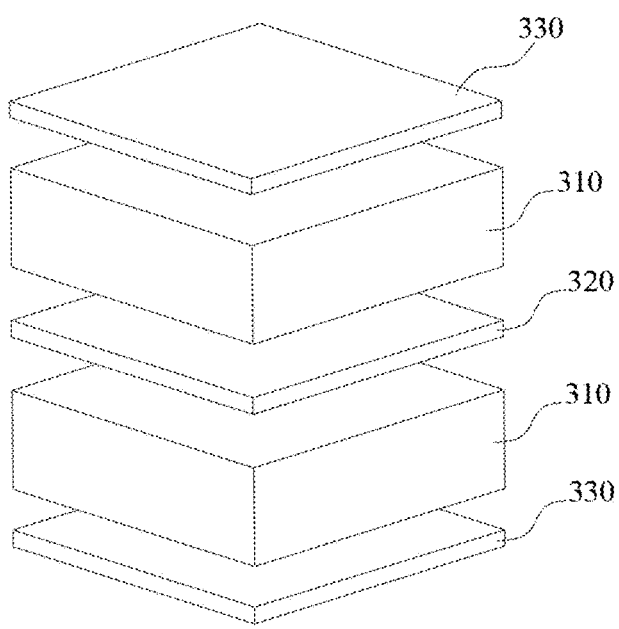
FIG. 10 is an exploded view of another fire protection plate provided by an embodiment of the present disclosure.

With reference to FIG. 6, an accommodating portion 41 including an opening is disposed on the buffering separation plate 40, and the fire protection plate 30 is disposed in the accommodating portion 41. Disposing the fire protection plate 30 in the accommodating portion 41 of the buffering separation plate 40 will not or substantially not increase the volume of the battery casing 2, which is beneficial for the battery casing 2 to having a high volume energy density. Moreover, in this way, the fire protection will be performed on a fixed position of the thermal runaway battery cell 20 in a targeted manner, thereby retarding the spread of the thermal runaway in the casing body 10 more effectively.

Generally, after the charge and discharge cycle of the battery casing 2, a middle region of the battery cell 20 having a large area expands heavily, and a region around the central region (referred to as a peripheral region) expands lowly, and particularly an edge region hardly expands. Therefore, the accommodating portion 41 can be disposed in the peripheral region of the buffering separation plate 40. In this way, the volume of the battery casing 2 would not be increased.

In some embodiments, the area of the fire protection plate 30 disposed in the buffering separation plate 40 is 10%-40%, for example, 15%-30%, of the area of the buffering separation plate 40. This allows the fire protection plate 30 to more effectively exert the fire protection function without affecting the buffering function of the buffering separation plate 40.

It can be understood that the disposition of the plurality of fire protection plates 30 inside the casing body 10 can also be a combination of any two or more of the above-mentioned disposition examples.

In some embodiments, the fire protection plate 30 may also be provided at an outer side of the casing body 10. For example, the fire protection plate 30 is attached to the outer wall face of the casing body 10. When the overall temperature of the casing body 10 rises or an open fire overflows, the fire protection plate 30 at the outer side of the casing body 10 can be triggered to cool down or extinguish the fire in the casing body 10. Of course, the fire protection plate 30 at the outer side of the casing body 10 can also retard the thermal runaway of the battery casing 2 caused by a high-temperature source or a fire source outside the battery casing 2 and protect the battery casing 2 against fire comprehensively.

In some embodiments, the aerosol generating agent in the fire protection plate 30 includes an oxidant, a combustible agent, and a binder, the oxidant includes one or more of nitrate, halogen acid salt, and perhalic acid salt, and the combustible agent includes one or more of an organic combustible agent and an inorganic combustible agent. A gas production rate of the aerosol generating agent is relatively high, the smothering effect of inert gas such as carbon dioxide, water vapor, and even nitrogen in the combustion production on the flame, the cooling effect of water vapor, material decomposition, and the like, and the terminating effect of the generated fine metal particles on the combustion reaction chain can achieve a high efficient fire protection effect, thereby extinguishing the fire quickly and timely and effectively retarding the re-ignition of the extinguished fire. In addition, the performance of the aerosol generating agent is stable, and the combustion production has a little pollution to the environment and have no obvious toxicity to organisms.

In some embodiments, the nitrate used as the oxidant may be selected from one or more of sodium nitrate, potassium nitrate, strontium nitrate, and ammonium nitrate.

In some embodiments, the halogen acid salt used as the oxidant may be selected from one or more of potassium halate and sodium halate. For example, the halogen acid salt includes one or more of potassium chlorate and sodium chlorate.

In some embodiments, the perhalic acid salt used as the oxidant may be selected from one or more of potassium perhalate and sodium perhalate. For example, the perhalic acid salt includes one or more of potassium perchlorate and sodium perchlorate.

In some embodiments, the oxidant of the aerosol generating agent includes nitrate and perhalic acid salt, the nitrate includes one or more of sodium nitrate, potassium nitrate, strontium nitrate, and ammonium nitrate, and the perhalic acid salt includes one or more of potassium perchlorate and sodium perchlorate.

In some embodiments, the organic combustible agent may be selected from solid organic compounds. Optionally, the organic combustible agent includes sugars. For example, the organic combustible agent includes one or more of cellulose, nitrocellulose, cotton chip, paper chip, wood chip, lactose, sucrose, and iditol.

In some embodiments, the inorganic combustible agent may be selected from one or more of phosphorus, sulfur, carbon-based combustible agent, and metal-based combustible agent. Optionally, the inorganic combustible agent includes one or more of phosphorus, sulfur, biomass charcoal, magnesium, aluminum, zirconium, and magnesium aluminum alloy.

In some embodiments, the combustible agent of the aerosol generating agent includes one or more of lactose, sucrose, iditol, and biomass charcoal (such as wood charcoal).

The binder is used to bind the individual components, for example, oxidant, combustible agent, or the like, of the aerosol generating agent together to form a sheet-shaped thermal aerosol fire protection layer 310. In addition, when the fire protection plate 30 further includes other layer structures, the binder can also bind the thermal aerosol fire protection layer 310 with the adjacent layer structure. There is no particular limitation on the type of binder herein, and the binder can be one or more of natural resin and synthetic resin. The natural resin may include shellac, rosin, or the like. The synthetic resin may include phenolic resin, polyvinyl chloride, epoxy resin, or the like. In some embodiments, the binder includes one or more of phenolic resin, polyvinyl chloride, shellac, rosin, and epoxy resin.

In some embodiments, the aerosol generating agent may contain 50-80 parts, for example, 55-75 parts or 60-70 parts, by weight of the oxidant. The content of the oxidant is within an appropriate range, so the oxidant can provide enough oxygen for the combustible agent to combust quickly. In particular, the oxidant with an appropriate content can generate a large amount of gas or particles that have a smothering and cooling effects on the flame and/or a terminating effect on the combustion reaction chain, thereby achieving a high efficient fire protection effect.

In some embodiments, the aerosol generating agent may contain 10-35 parts, for example, 15-30 parts or 20-25 parts, by weight of the combustible agent. The combustible agent having a content within an appropriate range can promote the combustion of the aerosol generating agent and quickly generate a large amount of gas or particles that have a smothering effect and a cooling effect on the flame and/or a terminating effect on the combustion reaction chain, thereby achieving a high efficient fire protection effect.

In some embodiments, the aerosol generating agent may contain 1-5 parts such as 2-4 parts by weight of the binder.

In some embodiments, the aerosol generating agent may further include additive having one or more of carbonate, bicarbonate, metal halide, ammonium halide, and metal oxide. Adding the additive to the aerosol generating agent can increase the fine solid particles in the aerosol, so its terminating effect on the combustion reaction chain is strengthened, thereby improving the fire protection efficiency. In particular, the use of the fire protection plate 30 can also enable quick and repeated extinguishing reactions, thereby preventing the re-ignition of the open fire of the battery casing 2. In particular, when the aerosol generating agent containing carbonate, bicarbonate and/or ammonium halide combusts, the carbonate, bicarbonate, and/or ammonium halide will decompose and absorb heat, thereby reducing the ignition temperature of the battery casing 2. Moreover, the gas generated by decomposition can neither combust nor support combustion, and can dilute the oxygen concentration in the ambient environment of the fire. Therefore, by adding one or more of carbonate, bicarbonate, and ammonium halide to the aerosol generating agent, the fire extinguishing efficiency of the fire protection plate 30 can be further improved.

In some embodiments, the additive includes one or more of carbonate and bicarbonate.

Optionally, the carbonate used as the additive may be selected from one or more of the carbonates of groups IA and IIA metal elements in the periodic table. For example, the carbonate is selected from one or more of magnesium carbonate, strontium carbonate, potassium carbonate, and sodium carbonate.

Optionally, the bicarbonate used as the additive may be selected from one or more of the bicarbonate of groups IA and IIA metal elements in the periodic table. For example, the bicarbonate is selected from one or more of magnesium bicarbonate, potassium bicarbonate, and sodium bicarbonate.

The metal halide may include one or more of metal fluoride, metal chloride, metal bromide, and metal iodide, and is, for example, metal chloride. The metal element in the metal halide can be selected from one or more of the groups IA and IIA metal elements in the periodic table. For example, the metal halide may include one or more of potassium chloride, sodium chloride, magnesium chloride, and strontium chloride.

The ammonium halide may include one or more of ammonium fluoride, ammonium chloride, ammonium bromide, and ammonium iodide, and is, for example, ammonium chloride.

The metal oxide may be selected from one or more of the oxides of groups IA and IIA metal elements in the periodic table. For example, the metal oxide may include one or more of potassium oxide, sodium oxide, magnesium oxide, and strontium oxide.

In some embodiments, the aerosol generating agent has ≤20 or ≤15 parts by weight of the additive. Optionally, the aerosol generating agent may have 0.5-15, for example, 5-15 or 8-12 parts, by weight of the additive.

In some embodiments, the fire protection plate 30 may further include an accelerant which is selected from one or more of nitrocellulose, celluloid, sulfur, and camphor. By adding the accelerant to the fire protection plate 30, the trigger temperature of the fire protection plate 30 for fire protection is lowered. The ignition point of the accelerant is relatively low, and therefore when the battery of the battery casing is thermal runaway, the accelerant quickly absorbs heat and combusts by itself, so the temperature of the fire protection plate 30 rises quickly and the reactions of the oxidant, reducing agent, or the like in the aerosol generating agent are initiated, thereby achieving a quick and timely fire protection effect. The accelerant can reduce the trigger temperature of the fire protection plate 30 from about 500° C. to a range significantly less than 500° C. The trigger temperature here refers to the ambient temperature around the fire protection plate 30. The fire protection plate 30 can also be used to extinguish multiple fires and prevent the re-ignition of the open fire.

The accelerant can be added to the fire protection plate 30 in various ways. As an example, with reference to FIG. 7, the accelerant described above may be included in the thermal aerosol fire protection layer 310. That is to say, the accelerant is dispersed in the thermal aerosol fire protection layer 310.

In some embodiments, the accelerant is present in the thermal aerosol fire protection layer 310 in percentage by weight of 0.5%-10%, for example, 1%-10%, 1%-5%, or 2%-5%.

As another example, with reference to FIGS. 8 to 10, the fire protection plate 30 may further include an accelerating layer 320 which contains the accelerant described above.

The accelerant layer 320 may be disposed in the fire protection plate 30 in various ways. For example, the accelerant layer 320 and the thermal aerosol fire protection layer 310 may be stacked. Specifically, the thermal aerosol fire protection layer 310 has two opposite surfaces in its own thickness direction, and the accelerant layer 320 can be stacked on either or both of the two opposite surfaces. Alternatively, the fire protection plate 30 includes two or more thermal aerosol fire protection layers 310, and the accelerant layer 320 may be disposed between at least two adjacent thermal aerosol fire protection layers 310.

As another example, the accelerant layer 320 is disposed on at least one side of the thermal aerosol fire protection layer 310. Specifically, the accelerant layer 320 is attached to any one or more sides of the thermal aerosol fire protection layer 310.

In some embodiments, the accelerant layer 320 may further contain an adhesive. The accelerant is bound to the thermal aerosol fire protection layer 310 by the adhesive. The accelerant may be present in the accelerant layer 320 in percentage by weight of 60% or more, for example, 80%-95%.

In some embodiments, the accelerant layer 320 may be 10 micrometers-200 micrometers, for example, 30 micrometers-150 micrometers, or 50 micrometers-100 micrometers in thickness.

In some embodiments, the fire protection plate 30 may further include an encapsulating layer 330. For example, the encapsulating layer 330 is disposed on each of the opposite sides of the fire protection plate 30 in its own thickness direction, so as to isolate and protect the structure (such as the thermal aerosol fire protection layer 310 and the optional accelerant layer 320) between the encapsulating layers 330 on the two sides. The disposition of the encapsulating layer 330 can prevent the moisture in the air or the like from penetrating into the thermal aerosol fire protection layer 310 and the optional accelerant layer 320, thereby guaranteeing a high fire extinguishing efficiency of the fire protection plate 30.

As an example, the fire protection plate 30 includes the encapsulating layers 330 separately disposed on the two sides of the fire protection plate 30 in its own thickness direction and the fire protection layer between the encapsulating layers 330 enclosed on the two sides, and includes the thermal aerosol fire protection layer 310 and the optional accelerant layer 320 described above. When the fire protection layer contains the accelerant layer 320, the disposing manners of the thermal aerosol fire protection layer 310 and the accelerant layer 320 can be that as described above.

In the fire protection plate 30, the encapsulating layer 330 may be made of material with good moisture proof property. Further, the material of the encapsulating layer 330 is not flammable. For example, the material of the encapsulating layer 330 may be selected from one or more of polyethylene terephthalate, polylactic acid, polycaprolactone, polyethylene, polypropylene, polycarbonate, polyurethane, or the like.

In the fire protection plate 30, the encapsulating layer 330 may be 10 micrometers-200 micrometers, for example, 30 micrometers-150 micrometers or 50 micrometers-100 micrometers thickness. The encapsulating layer 330 having an appropriate thickness can effectively act as a barrier to moisture and also ensure the quick and effective trigger of the thermal aerosol fire protection layer 310.

EXAMPLE

The following embodiments more specifically describe the content disclosed by the present disclosure, and are intended to be merely illustrative, because various modifications and changes in the scope of the present disclosure will be apparent to those skilled in the art. All parts, percentages, and ratios reported in the following embodiments are on weight basis unless otherwise stated, and all reagents used in the embodiments are commercially available or synthetically obtained by conventional methods and are directly used without further processing, and the instruments used in the embodiments are commercially available.

Example 1

The fire protection plate included an encapsulating layer, a thermal aerosol fire protection layer, and an encapsulating layer in order in its own thickness direction, and the accelerant layer was attached to some sides of the thermal aerosol fire protection layer. The material of the encapsulating layer was polyethylene terephthalate, and the encapsulating layer was 50 micrometers in thickness. The thermal aerosol fire protection layer included an aerosol generating agent. The aerosol generating agent included potassium nitrate, strontium nitrate, lactose, magnesium powder, ammonium chloride, and potassium bicarbonate, and the mass ratio of respective components was 40:20:10:10:8:8. Phenolic resin was used as the binder, and the binder was present in the thermal aerosol fire protection layer in a percentage by mass of 4%. The accelerating layer contained celluloid as an accelerant and phenolic resin as a binder, the content of the accelerant was 85%, and the accelerant layer was 80 micrometers in thickness.

The plurality of battery cells were assembled into the battery module by using end plates and side plates under a certain pre-tightening force according to requirements, the fire protection plate was disposed between every two adjacent battery cells, and each battery cell had one mono-battery. The end plates were located at both ends of the battery module, the side plates were located on both sides of the battery module, and a 10 mm-diameter hole was reserved in one end plate. The battery module was charged to a charging cut-off voltage with a current of 1 C at a temperature of 25±5° C., and was ready for use. Temperature sensors were installed between the mono-batteries and on a side of the mono-battery, and a voltage detector was installed at a leading-out position of the positive and negative electrodes of the battery module.

According to the requirement for the remaining free space, the casing body of a suitable size was chosen and prepared, and the material of the casing body was a 2 mm-thick steel. The casing body of the battery casing included a casing cover and a casing base. The casing cover included a cap plate and side cover plates connected to the cap plate. An 8 mm-diameter hole was reserved in the side cover plate close to the end plate to be pricked. A 40 mm-diameter hole for the explosion-proof valve was reserved on the side cover plate adjacent to the hole to be pricked, and a matching explosion-proof valve was installed before the test. On another side cover plate opposite to the side cover plate where the explosion-proof valve was installed, a 17 mm-diameter hole was reserved so as to lead out cables detecting the temperature and voltage in the casing body.

The battery module was fixed to the casing base, and the casing cover was covered on the casing base. A foam rubber buffering seal ring was placed between the casing cover and the casing base and was tightened and sealed by a bolt. The reserved hole in the end plate of the battery module was aligned with the hole to be pricked reserved in the casing body.

The mono-battery included a housing and a bare battery core and an electrolyte packaged in the housing. The bare battery core was a winding structure including a positive electrode plate, a separator, and a negative electrode plate, and the separator was located between the positive and negative electrode plates for isolation.

$LiNi_{0.8}Co_{0.1}Mn_{0.1}O_2$ as a positive electrode active material, conductive carbon black, and polyvinylidene fluoride (PVDF) as the binder were dispersed into a solvent N-methylpyrrolidone (NMP) in a weight ratio of 8:1:1 and stirred uniformly to obtain a positive electrode slurry; the positive electrode slurry was uniformly coated on a positive electrode current collector aluminum foil, and the positive electrode plate was obtained by drying, cold pressing, slitting, and sheet cutting.

Artificial graphite as a negative electrode active material, conductive carbon black, sodium carcasingymethyl cellulose (CMC) as a thickener, and styrene butadiene rubber (SBR) as the binder were dispersed into the solvent which was deionized water in a weight ratio of 89:6:3:2 and stirred uniformly to obtain a negative electrode slurry; the negative electrode slurry was uniformly coated on a negative electrode current collector copper foil; and the negative electrode plate was obtained by drying, cold pressing, slitting, and sheet cutting.

An organic solvent was obtained by uniformly mixing ethylene carbonate (EC), ethyl methyl carbonate (EMC), and diethyl carbonate (DEC) in a volume ratio of 1:1:1. The electrolyte was obtained by dissolving $LiPF_6$ of 1 mol/L in the organic solvent described above.

A PP/PE/PP composite separator was used as a separator.

In the battery casing, the total mass A of the aerosol generating agent in the casing body was 1.5 g, and the free space volume B of the casing body was 50 L. That is, the total mass A of the aerosol generating agent in the casing body and the free space volume B of the casing body satisfied a relationship as represented by A/B=0.03 g/L.

Examples 2-10 and Comparative Examples 1-2

The difference from Example 1 was that the total mass A of the aerosol generating agent in the casing body was adjusted so that the total mass A of the aerosol generating agent in the casing body and the free space volume B of the casing body satisfied a different relationship, and the details were shown in Table 1.

Examples 11-14

The difference from Example 1 was that the fire protection plate was disposed on the inner wall face of the casing body; the total mass A of the aerosol generating agent in the casing body was adjusted so that the total mass A of the aerosol generating agent in the casing body and the free space volume B in the casing body satisfied a different relationship; and the details were shown in Table 1.

Examples 15-18

The difference from Example 1 was that the fire protection plate did not contain the accelerating layer, that is, it did not contain the accelerant; the aerosol generating agent included potassium nitrate, ammonium nitrate, strontium nitrate, lactose, magnesium powder, and sulfur, and the mass ratio of the respective components was 35:15:20:15:5:7; the binder was present in the thermal aerosol fire protection layer in a percentage by mass of 3%; the total mass A of the aerosol generating agent in the casing body was adjusted so that the total mass A of the aerosol generating agent in the casing body and the free space volume B of the casing body satisfied a different relationship; and details were shown in Table 1.

Comparative Example 3

The difference from Example 1 was that the battery casing was not disposed with the fire protection plate.

Comparative Example 4

The difference from Example 1 was that the fire protection plate included the encapsulating layer, the accelerant layer, and the encapsulating layer in order in its own thickness direction.

Examples 19-25 and Comparative Example 5

The difference from Example 1 was that in the battery casing, the free space volume B of the casing body was 100 L; the total mass A of the aerosol generating agent in the casing body was adjusted so that the total mass A of the aerosol generating agent in the casing body and the free space volume B of the casing body satisfied a different relationship; and details were shown in Table 1.

Examples 26-29 and Comparative Example 6

The difference from Example 19 was that the fire protection plate did not contain the accelerating layer, that is, it did not contain the accelerant; the total mass A of the aerosol generating agent in the casing body was adjusted so that the total mass A of the aerosol generating agent in the casing body and the free space volume B of the casing body satisfied a different relationship; and details were shown in Table 1.

Comparative Example 7

The difference from Example 19 was that the battery casing was not disposed with the fire protection plate.

Examples 30-35 and Comparative Example 8

The difference from Example 1 was that in the battery casing, the free space volume B of the casing body was 200 L; and the total mass A of the aerosol generating agent in the casing body was adjusted so that the total mass A of the aerosol generating agent in the casing body and the free space volume B of the casing body satisfied a different relationship, with details shown in Table 1.

Comparative Example 9

The difference from Example 30 was that the battery casing was not disposed with the fire protection plate.

Test Section
(1) Safety Performance Test of the Battery Casing

The battery casing was placed on a prick test bench, a prick port and a prick steel needle were aligned, and the steel needle was kept level. A 3 mm-stainless steel needle was used to prick at a speed of 0.1 mm/s, the pricking was stopped when the pricking depth reaches the middle portion of the first mono-battery, and the steel needle remained in the mono-battery. A video recorded the entire experiment process and was used to observe the fire situation of the battery casing.

The test results were shown in Table 1.

TABLE 1

| | | safety performance test result of the battery casing |
|---|---|---|
| No. | A/B (g/L) | Fire situation in the battery casing |
| Example 1 | 0.03 | Fire in the first thermal runaway casing body was extinguished after 7 s, a second thermal runaway occurred in the casing body after 337 s, and the fire reignited and was extinguished after 12 s. |
| Example 2 | 0.04 | Fire in the first thermal runaway casing body was extinguished after 5 s, a second thermal runaway occurred in the casing body after 280 s, and the fire reignited and was extinguished after 7 s. |
| Example 3 | 0.06 | Fire in the first thermal runaway casing body was extinguished after 3 s, a second thermal runaway occurred in the casing body after 330 s, and the fire reignited and was extinguished after 5 s. |

TABLE 1-continued safety performance test result of the battery casing

| No. | A/B (g/L) | Fire situation in the battery casing |
|---|---|---|
| Example 4 | 0.1 | No open fire was generated in the first thermal runaway casing body, a second thermal runaway occurred in the casing body after 305 s, and the fire was extinguished after 3 s. |
| Example 5 | 0.2 | No open fire was generated in the thermal runaway casing body, a second thermal runaway occurred in the casing body after 275 s, and the fire was extinguished after 1 s. |
| Example 6 | 0.3 | No open fire was generated in the casing body. |
| Example 7 | 0.6 | No open fire was generated in the casing body. |
| Example 8 | 1 | No open fire was generated in the casing body. |
| Example 9 | 2 | No open fire was generated in the casing body; and the amount of the gas generated in the casing body was large, and the cover body was damaged. |
| Example 10 | 4 | No open fire was generated in the casing body; and the amount of the gas generated in the casing body was large, and the cover body was damaged. |
| Example 11 | 0.04 | Fire in the first thermal runaway casing body was extinguished after 3 s, a second thermal runaway occurred in the casing body after 335 s, and the fire reignited and was extinguished for 7 s. |
| Example 12 | 0.06 | Fire in the first thermal runaway casing body was extinguished after 2 s, a second thermal runaway occurred in the casing body after 371 s, and the fire reignited and was extinguished for 5 s. |
| Example 13 | 0.1 | No open fire was broke out in the thermal runaway casing body, a second thermal runaway occurred in the casing body after 325 s, and the fire was extinguished after 3 s. |
| Example 14 | 0.2 | No open fire was broke out in the thermal runaway casing body, a second thermal runaway occurred in the casing body after 310 s, and the fire was extinguished after 1 s. |
| Example 15 | 0.04 | Fire in the first thermal runaway casing body was extinguished after 10 s, a second thermal runaway occurred in the casing body after 273 s, and the fire reignited and was not extinguished. |
| Example 16 | 0.06 | Fire in the first thermal runaway casing body was extinguished after 8 s, a second thermal runaway occurred in the casing body after 331 s, and the fire reignited and was not extinguished. |
| Example 17 | 0.1 | Fire in the first thermal runaway casing body was extinguished after 5 s, a second thermal runaway occurred in the casing body after 320 s, and the fire reignited and was not extinguished. |
| Example 18 | 0.2 | No open fire was generated in the casing body, a second thermal runaway occurred in the casing body after 286 s, and the fire was not extinguished. |
| Example 19 | 0.03 | Fire in the first thermal runaway casing body was extinguished after 7 s, a second thermal runaway occurred in the casing body after 295 s, and the fire reignited and was extinguished after 9 s. |
| Example 20 | 0.05 | Fire in the first thermal runaway casing body was extinguished after 3 s, a second thermal runaway occurred in the casing body after 355 s, and the fire reignited and was extinguished after 5 s. |
| Example 21 | 0.1 | No open fire was generated in the first thermal runaway casing body, the second thermal runaway occurred in the casing body after 365 s, and the fire was extinguished after 3 s. |
| Example 22 | 0.15 | No open fire was generated in the first thermal runaway casing body, the second thermal runaway occurred in the casing body after 390 s, and the fire was extinguished after 1 s. |
| Example 23 | 0.3 | No open fire was generated in the casing body. |
| Example 24 | 0.5 | No open fire was generated in the casing body. |
| Example 25 | 1 | No open fire was generated in the casing body. |
| Example 26 | 0.03 | Fire in the first thermal runaway casing body was extinguished after 10 s, a second thermal runaway occurred in the casing body after 315 s, and the fire reignited and was not extinguished. |
| Example 27 | 0.05 | Fire in the first thermal runaway casing body was extinguished after 6 s, a second thermal runaway occurred in the casing body after 377 s, and the fire reignited and was extinguished after 8 s. |
| Example 28 | 0.1 | Fire in the first thermal runaway casing body was extinguished after 5 s, a second thermal runaway occurred in the casing body after 315 s, and the fire reignited and was extinguished after 7 s. |
| Example 29 | 0.15 | Fire in the first thermal runaway casing body was extinguished after 3 s, a second thermal runaway occurred in the casing body after 358 s, and the fire reignited and was extinguished after 5 s. |
| Example 30 | 0.03 | Fire in the first thermal runaway casing body was extinguished after 8 s, a second thermal runaway occurred in the casing body after 365 s, and the fire reignited and was extinguished after 11 s. |
| Example 31 | 0.05 | Fire in the first thermal runaway casing body was extinguished after 3 s, a second thermal runaway occurred in the casing body after 316 s, and the fire reignited and was extinguished after 5 s. |
| Example 32 | 0.075 | No open fire was generated in the first thermal runaway casing body, a second thermal runaway occurred in the casing body after 373 s, and the fire was extinguished after 3 s. |
| Example 33 | 0.15 | No open fire was generated in the first thermal runaway casing body, a second thermal runaway occurred in the casing body after 305 s, and the fire was extinguished after 2 s. |

TABLE 1-continued safety performance test result of the battery casing

| No. | A/B (g/L) | Fire situation in the battery casing |
|---|---|---|
| Example 34 | 0.25 | No open fire was generated in the casing body. |
| Example 35 | 0.5 | No open fire was generated in the casing body. |
| Comparative Example 1 | 0.01 | After the battery core was thermal runaway, fire was broke out in the casing body and was not extinguished. |
| Comparative Example 2 | 0.02 | After the battery core was thermal runaway, fire was broke out in the casing body and was not extinguished. |
| Comparative Example 3 | / | After the battery core was thermal runaway, fire was broke out in the casing body and the casing body was combusted through. |
| Comparative Example 4 | / | After the battery core was thermal runaway, fire was broke out in the casing body and the casing body was combusted through. |
| Comparative Example 5 | 0.02 | After the battery core was thermal runaway, fire was broke out in the casing body and was not extinguished. |
| Comparative Example 6 | 0.02 | After the battery core was thermal runaway, fire was broke out in the casing body and was not extinguished. |
| Comparative Example 7 | / | After the battery core was thermal runaway, fire was broke out in the casing body and the casing body was combusted through. |
| Comparative Example 8 | 0.025 | After the battery core was thermal runaway, fire was broke out in the casing body and was not extinguished. |
| Comparative Example 9 | / | After the battery core was thermal runaway, fire was broke out in the casing body and the casing body was combusted through. |

It can be known from the comparison of Examples 1-18 and Comparative Examples 1-4, Examples 19-29 and Comparative Examples 5-7, and Examples 30-35 and Comparative Examples 8-9 that the embodiments of the present disclosure effectively extinguished the open fire of the battery casing and retarded the re-ignition of the open fire of the battery casing, and thus by disposing the fire protection plate containing the aerosol generating agent in the battery casing and controlling the total mass A of the aerosol generating agent in the casing body and the free space volume B of the casing body to satisfied the specific relationship, the open fire of the battery casing was effectively extinguished and the re-ignition of the open fire of the battery casing was effectively retarded, thereby causing the battery casing to have a high safety performance.

It can be known from the results of Examples 1~10 and Examples 15~18 that the fire protection plate containing the oxidant and the combustible agent can effectively extinguish the open fire of the battery casing. In particular, the fire protection plate further containing additive and accelerant can effectively extinguish the open fire of the battery casing and prevent the re-ignition of the open fire of the battery casing.

It can be known from the results of Examples 19-22 and Examples 26-29 that the fire protection plate further containing the accelerant can further improve the fire protection efficiency of the battery casing.

The above is only the specific embodiment of the present disclosure, but the scope of the present disclosure is not limited thereto. Various equivalent modifications and variations of the present disclosure that can be easily conceived by those skilled in the art are intended to be included within the scope of the present disclosure. Therefore, the scope of the present disclosure should be determined by the scope of the claims.

What is claimed is:

1. A battery casing, comprising a casing body, a plurality of battery cells accommodated in the casing body, and a fire protection plate which is disposed inside the casing body, at least disposed corresponding to the plurality of battery cells, and comprises a thermal aerosol fire protection layer which comprises an aerosol generating agent, the aerosol generating agent comprising an oxidant, a combustible agent, and a binder, the oxidant comprising one or more of nitrate, halogen acid salt, and perhalic acid salt, the combustible agent comprising one or more of an organic combustible agent and an inorganic combustible agent, and the aerosol generating agent comprising 50-80 parts by weight of the oxidant, 10-35 parts by weight of the combustible agent, and 1-5 parts by weight of the binder, characterized in that a total mass A of the aerosol generating agent in the casing body and a free space volume B of the casing body satisfy a relationship as represented by $0.03 \text{ g/L} \leq A/B \leq 8 \text{ g/L}$, a free space of the casing body refers to a remaining space except the space occupied by the plurality of battery cells in the space enclosed by the casing body, the fire protection plate, and other accessories, and the free space volume B of the casing body is a volume of the remaining space.

2. The battery casing according to claim 1, wherein the total mass A and the free space volume B satisfy a relationship as represented by $0.03 \text{ g/L} \leq A/B \leq 4 \text{ g/L}$.

3. The battery casing according to claim 1, wherein the aerosol generating agent satisfies at least one of the following:

the nitrate is selected from one or more of sodium nitrate, potassium nitrate, strontium nitrate, and ammonium nitrate;
the halogen acid salt is selected from one or more of potassium halate and sodium halate;
the perhalic acid salt is selected from one or more of potassium perhalate and sodium perhalate;
the organic combustible agent is selected from a solid organic compound;
the inorganic combustible agent is selected from one or more of phosphorus, sulfur, a carbon-based combustible agent and a metal-based combustible agent; and
the binder comprises one or more of a natural resin and a synthetic resin.

4. The battery casing according to claim 1, wherein the aerosol generating agent further comprises an additive, which comprises one or more of carbonate, bicarbonate, metal halide, ammonium halide, and metal oxide.

5. The battery casing according to claim 4, wherein the aerosol generating agent comprises less than or equal to 20 parts by weight of the additive.

6. The battery casing according to claim 1, wherein the thermal aerosol fire protection layer further comprises an accelerant which comprises one or more of nitrocellulose, celluloid, sulfur, and camphor.

7. The battery casing according to claim 6, wherein the accelerant is present in the thermal aerosol fire protection layer in percentage by weight of 0.5%-10%.

8. The battery casing according to claim 1, wherein the fire protection plate further comprises an accelerant layer, the accelerant layer stacked with the thermal aerosol fire protection layer, and/or the accelerant layer disposed on at least one side of the thermal aerosol fire protection layer; and
the accelerant layer comprises one or more of nitrocellulose, celluloid, sulfur, and camphor.

9. The battery casing according to claim 1, wherein encapsulating layers are disposed on opposite two sides of the fire protection plate in its own thickness direction so as to isolate and protect a structure between the encapsulating layers on the two sides.

10. The battery casing according to claim 1, wherein there are one or more fire protection plates inside the casing body, and in the case where there are more than one fire protection plate in the casing body, each of the fire protection plates is disposed corresponding to at least one of the plurality of battery cells.

11. The battery casing according to claim 1, wherein the battery casing further satisfies at least one of the following:
the fire protection plate is disposed between at least two adjacent ones of the plurality of battery cells;
the fire protection plate is disposed on at least one side of at least one of the plurality of battery cells in a width direction of a corresponding one of the plurality of battery cells;
the fire protection plate is disposed on a side of the at least one of the plurality of battery cells where an explosion-proof valve is located; and
the fire protection plate is disposed on an inner side wall and/or an inner top wall of the casing body.

12. The battery casing according to claim 1, wherein a buffering separation plate is disposed between every two adjacent ones of the plurality of battery cells, the buffering separation plate is disposed with an accommodating portion comprising an opening, and the fire protection plate is disposed in the accommodating portion.

13. A device comprising a battery casing according to claim 1.

* * * * *